US 8,902,743 B2

(12) United States Patent
Greenberg et al.

(10) Patent No.: US 8,902,743 B2
(45) Date of Patent: Dec. 2, 2014

(54) DISTRIBUTED AND SCALABLE NETWORK ADDRESS TRANSLATION

(75) Inventors: Albert Greenberg, Redmond, WA (US); David A. Maltz, Bellevue, WA (US); Parveen K. Patel, Redmond, WA (US); Lihua Yuan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 444 days.

(21) Appl. No.: 12/824,989

(22) Filed: Jun. 28, 2010

(65) Prior Publication Data

US 2011/0317554 A1 Dec. 29, 2011

(51) Int. Cl.
*G08C 15/00* (2006.01)
*H04J 3/22* (2006.01)
*H04L 12/28* (2006.01)
*G06F 15/16* (2006.01)
*G06F 15/173* (2006.01)
*H04L 29/12* (2006.01)

(52) U.S. Cl.
CPC ...... *H04L 61/2517* (2013.01); *H04L 29/12396* (2013.01); *H04L 61/2525* (2013.01); *H04L 29/12377* (2013.01); *H04L 61/2514* (2013.01); *H04L 29/12367* (2013.01)
USPC ........... 370/230; 370/349; 370/392; 370/401; 370/471; 709/203; 709/218; 709/238; 709/242; 709/249

(58) Field of Classification Search
USPC ........... 370/230, 392, 231, 235, 395.1, 395.5, 370/395.52, 401, 465–467, 349, 471; 790/203, 230, 238, 249; 711/203, 206, 711/216; 726/3, 11–15; 709/203, 218, 238, 709/242, 245, 249
See application file for complete search history.

(56) References Cited

U.S. PATENT DOCUMENTS 6,999,462 B1 2/2006 Acharya
7,062,559 B2 6/2006 Yoshimura et al.
(Continued)

FOREIGN PATENT DOCUMENTS

WO WO-0155813 A2 8/2001

OTHER PUBLICATIONS

Hoover, J.N., "Microsoft to Mainstream Containerized Data Centers with C-Blox," Information Week, Apr. 8, 2008, http://www.informationweek.com/news/hardware/data_centers/showArticle.jhtml?articleID=207100452.

(Continued)

*Primary Examiner* — Marsha D Banks Harold
*Assistant Examiner* — Anthony Luo
(74) *Attorney, Agent, or Firm* — Ben Tabor; Kate Drakos; Micky Minhas (57) ABSTRACT

A method of enabling an electronic privately addressable source to be publicly addressable starts at a receiver where an electronic message is received. It is communicated from a sender with a private address outside a subnet of the receiver through a translator. The translator retrieves a lease to at least one of a public address or a port from a lease manager, translates the private address and the private port into a public address and a public port and communicates identifying data such as the public address and the public port to the receiver. If a response is communicated to the private sender, the response may be communicated to the private sender through the network. The public address and the public port on the message may be translated to the private address and the port of the private sender and the private address and the private port may be used to properly route the response to the private sender.

4 Claims, 6 Drawing Sheets

(56) References Cited

U.S. PATENT DOCUMENTS

| | | | | |
|---|---|---|---|---|
| 7,290,060 | B2* | 10/2007 | Kong | 709/245 |
| 2001/0034831 | A1* | 10/2001 | Brustoloni et al. | 713/151 |
| 2002/0184368 | A1 | 12/2002 | Wang | |
| 2003/0028671 | A1* | 2/2003 | Mehta et al. | 709/245 |
| 2004/0049579 | A1* | 3/2004 | Ims et al. | 709/225 |
| 2007/0002770 | A1 | 1/2007 | Haalen et al. | |
| 2007/0058642 | A1* | 3/2007 | Eisink | 370/401 |
| 2007/0123253 | A1* | 5/2007 | Simongini et al. | 455/433 |
| 2007/0127500 | A1* | 6/2007 | Maeng | 370/395.52 |
| 2007/0250608 | A1 | 10/2007 | Watt | |
| 2008/0310422 | A1 | 12/2008 | Booth et al. | |
| 2009/0327471 | A1* | 12/2009 | Astete et al. | 709/223 |
| 2010/0088742 | A1* | 4/2010 | Wiryaman et al. | 726/1 |
| 2010/0290477 | A1* | 11/2010 | Goemaere | 370/401 |

OTHER PUBLICATIONS

Gonsalves, A., "Rackable to Offer IBM Blade Servers in Containerized Data Center," InformationWeek, Jul. 29, 2008, http://www.informationweek.com/news/hardware/data_centers/showArticle.jhtml?articleID=209800044.

TechRepublic, "Data Center Design Overview," Data Center Fundamentals, Chapter 4, Cisco Systems, Inc., 2004, http://techrepublic.com.com/i/tr/downloads/home/1587050234_chapter_4.pdf, 42 pages.

Anderson et al., "An Implementation Guide for Integrating Thin-Client Servers with the Novell's ZENworks, and NDS Products," Apr. 21, 1999, http://support.citrix.com/servlet/KbServlet/download/543-102-8066/zenworks_nds.pdf, 63 pages.

* cited by examiner

DISTRIBUTED AND SCALABLE NETWORK ADDRESS TRANSLATION

BACKGROUND

This Background is intended to provide the basic context of this patent application and it is not intended to describe a specific problem to be solved.

As is well known, there are a limited number of dedicated IP addresses. As a result virtual IP addresses have been created to allow network users to access a network such as the Internet. However, the use of virtual IP addresses creates additional steps to decode the source and destination of packets. In addition, replying to packets from a virtual IP address is complicated and inefficient as the virtual IP address has to be converted to a private IP address and response to the virtual IP address do not offer guidance as to the private IP address that was the original sender.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The described method and apparatus are useful to allow private or non public IP addresses (including servers in data centers) be addressable by public IP addresses. In one embodiment, a method of enabling an electronic privately addressable source to be publicly addressable starts at the source of the electronic message. It is communicated from a sender with a private address outside a subnet of the receiver through a translator. The translator retrieves a lease to at least one of a public address or a port from a lease manager and translates the private address and the private port into a public address and a public port.

If a response is communicated to the private sender, the response may not be communicated to the private sender directly through the network. In one embodiment, a response is communicated to a first server where the response includes a message and the identifying data is encapsulated in the message. The public address and the public port on the message may be translated to the private address and the port of the private sender and the private address and the private port may be used to properly route the response to the private ip sender.

In another embodiment, a method of enabling an electronic privately addressable source to be publicly addressable is disclosed. Packets may be received from a tenant virtual machine at a policy routing component. It may be determined if the packets are destined for the Internet and if the packets contain a private address as a source. If the packets are destined for the Internet and contain the private address as the source, the packets may be communicated through a network address translation device. The network address translation device may be identified by a first virtual IP address of the network address translation device, the packets with the first virtual IP address may be encapsulated as the destination address and the packets may be communicated to a first server/load-balancing device that handles packets addressed to the first virtual IP address.

At the first server/load-balancing device, packets may be received. It may be determined if the packets are destined for the first virtual IP address of the network address translation device. If the packets are destined for the first virtual IP address of the network address translation device, the network address translation device may be selected. The inner packet to the network address translation device may be communicated. At the network translation device, the source address and the destination address and the source port and the destination port may be used to select a public address and a public port. The source address and source port may be translated to those selected at the network address translation device. The packet may then be communicated out on the Internet.

At the first server/load-balancing device, packets destined for the public IP address chosen above, the network translation device may be selected and the packet may be communicated to the network address translation device. At the network address translation device, the source address and destination address and source port and destination port may be used to select a private address and private port. The destination address and destination port may be translated to those selected at the network address translation device and the packet may be communicated to the private address sender.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
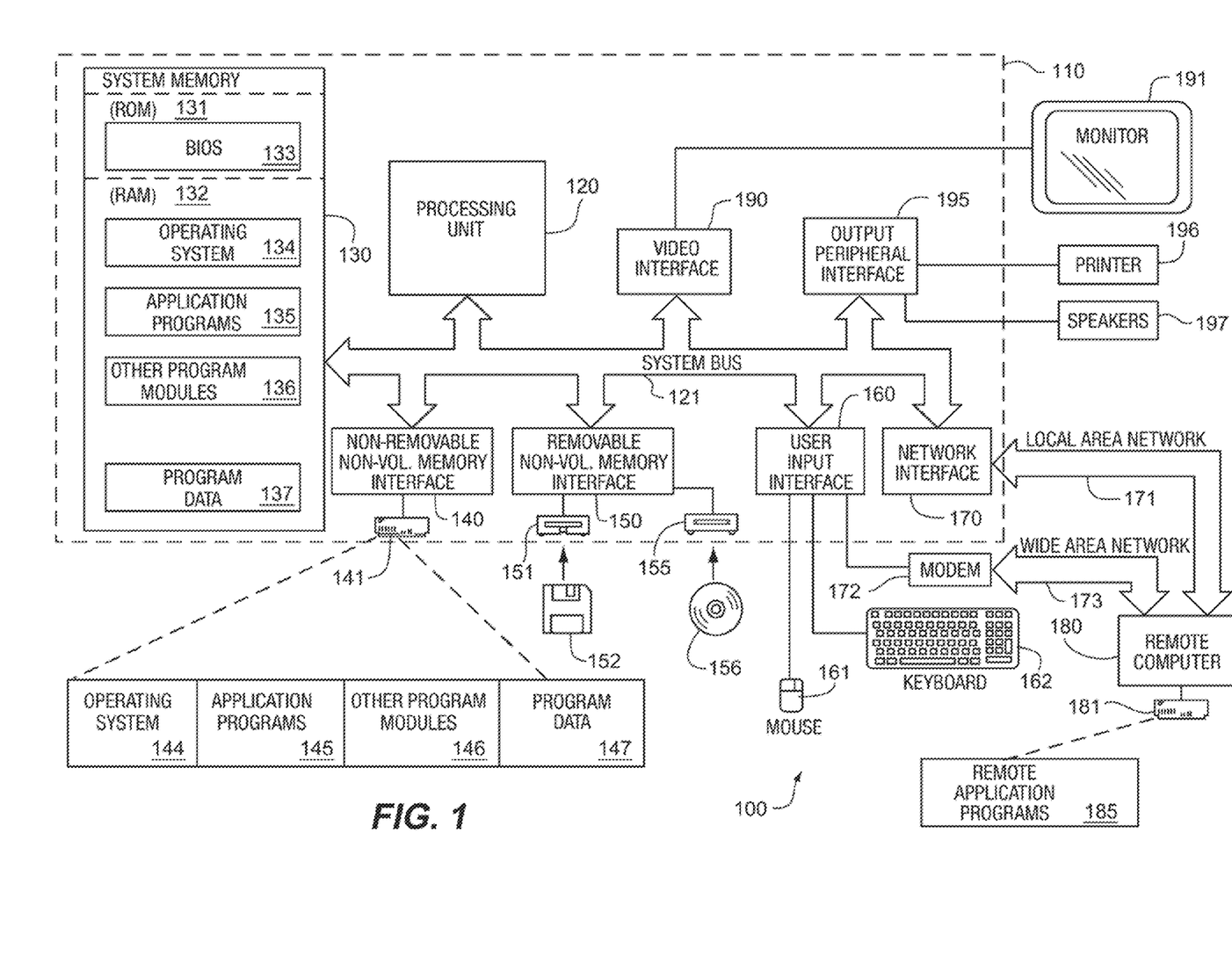
FIG. 1 is an illustration of a computing device.

FIG. 1 illustrates an example of a suitable computing system environment 100 that may operate to execute the many embodiments of a method and system described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to an optical disk 156. The hard disk drive 141, 151, and 155 may interface with system bus 121 via interfaces 140, 150.

A user may enter commands and information into the computer 110 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 195.

In conclusion, the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

Figure 2:
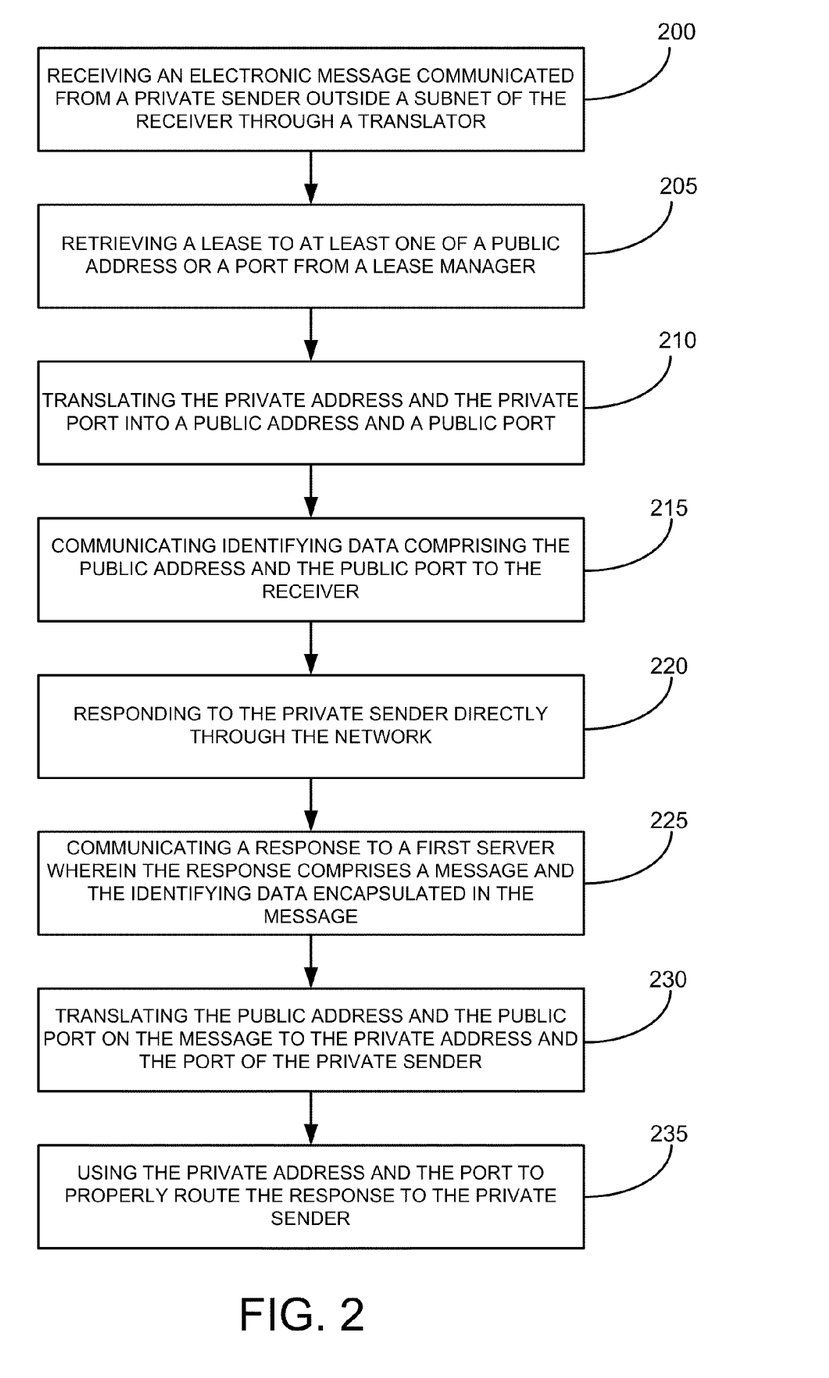
FIG. 2 is an illustration of a method of enabling an electronic privately addressable source to be publicly addressable.
Figure 3:
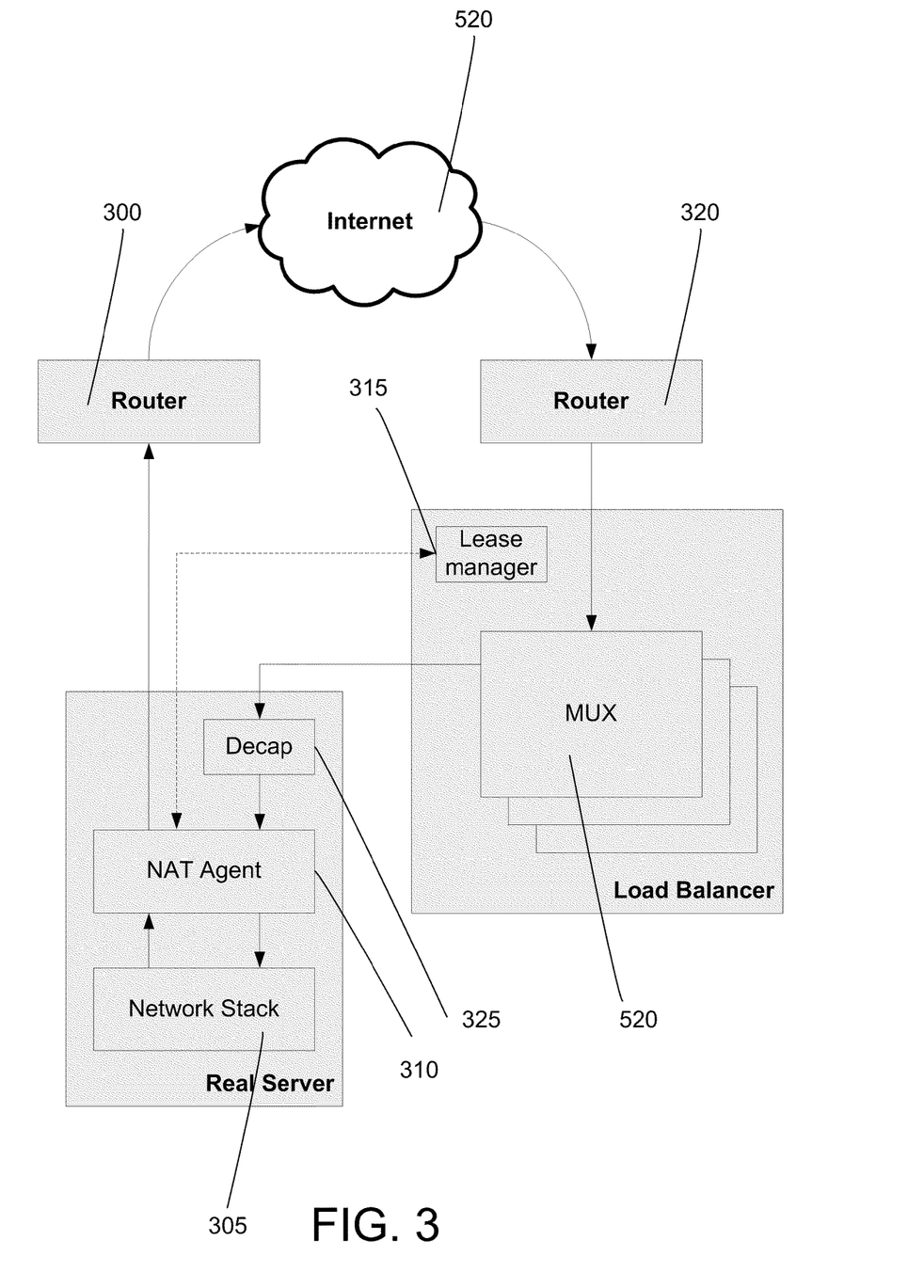
FIG. 3 is an illustration of packet flow through a sample network.

FIG. 2 is an illustration of a method of enabling an electronic privately addressable source to be publicly addressable. As is well known, there are a limited number of IP addresses. As a result, virtual IP addresses have been created to allow network users to access a network such as the Internet. However, the use of virtual IP addresses creates additional steps to decode the source and destination of packets. In addition, replying to packets from a virtual IP address is complicated and inefficient as the virtual IP address has to be converted to a public IP address and response to the public IP address do not offer guidance as to the virtual IP address that was the original sender. FIG. 3 is an illustration of packet flow through a sample network.

At block 200, at a receiver 300, an electronic message may be received that is communicated from a private internet protocol ("IP") sender 305 outside a subnet of the receiver. For example, the receiver 300 may have a subnet with several other IP addresses but the message is receiver from a subnet outside the subnet of the receiver 300.

The message may be received through a translator 310. The translator 310 may perform a variety of operations and may be located in a variety of locations. In one embodiment, the translator 310 is located on the same server as the private IP address sender. In another embodiment, the translator 310 is located on a different server 300 or network device than the private sender.

At block 205, the translator 310 may retrieve a lease to at least one of a public address or a port from a lease manager 315. As mentioned previously, the number of public IP addresses is limited. The translator 315 may allow more than one internal IP address use a single public IP address. The lease manager 315 may keep track of the internal IP address that has been assigned to the public IP address. A lease map which may include the leases of public ip addresses to private ip addresses may be stored in a memory. The lease manager 315 may review the lease periodically. If a lease is not renewed, the leased mappings may be re-used.

At block 210, the translator 310 may translate the private address and the private port into a public address and a public port. Identification data may include the public address and the public port. The identification data may be translated or converted into another form. The translation may occur in a variety of ways. In one embodiment, the translation may entail applying a hash function to the destination address and destination port. In some embodiments, the has function may have bi-direction affinity to the destination address and destination port. In this way, a response to the communication may be mapped to the correct dedicated IP address in response.

In one embodiment, the network address translation device contacts the lease manager 315 and obtains a mapping (VIP, N2) for this connection. The lease manager grants the mapping with a lease. The dedicated IP may renew the lease periodically. If the dedicated IP fails to renew the lease, the lease manager assumes that the leased mappings may be reclaimed. In some embodiments, the lease manager may grant leases on multiple mappings in the same request, which may improve performance for future requests.

In another embodiment, whenever the dedicated IP sees a new connection that needs translation, it forwards the packet to the lease manager. The lease manager assigns a virtual IP address and a port to it and sends the messages back to the dedicated IP using the chosen mapping. The dedicated IP may cache this mapping. From that point forward, the packets do not have to be communicated through the lease manager.

At block 215, identifying data may be communicated. The identifying data may include the public address and the public port to the receiver or any other relevant information. The header of the packet may contain the following information:

| TCP/IP header information | |
|---|---|
| Source IP Address | VIP |
| Source Port | N2 (issued by lease manager) |
| Destination IP Address | CIP |
| Destination Port | M |

At block 220, if a response is communicated to the private sender 305, the response may be communicated directly to the private sender 305 directly through the network by communicating a response to a first server 320 where the response comprises a message and the identifying data which is de-capsulated by a de-capsulator 325 from the message (block 225). At the server 320, the public address and the public port on the message may be translated to the private address and the port of the private sender 305 (block 230) and the private address and the port may be used to properly route the response to the private ip sender 305 (block 235). The translating the public address and the public port on the message to the private sender may entail retrieving lease information from the lease manager 315.

Figure 4:
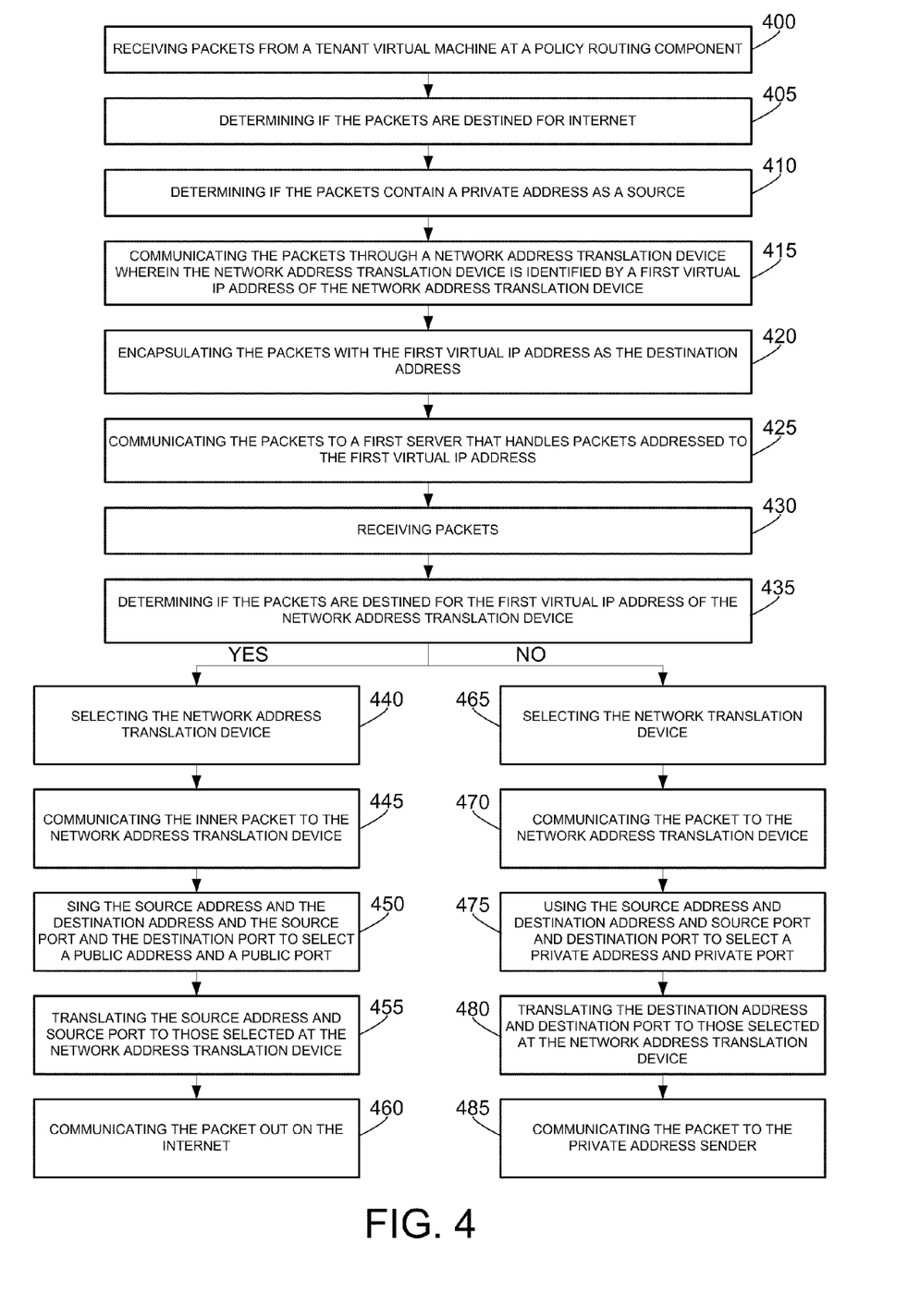
FIG. 4 is an illustration of a method of enabling an electronic privately addressable source to be publicly addressable.
Figure 5:
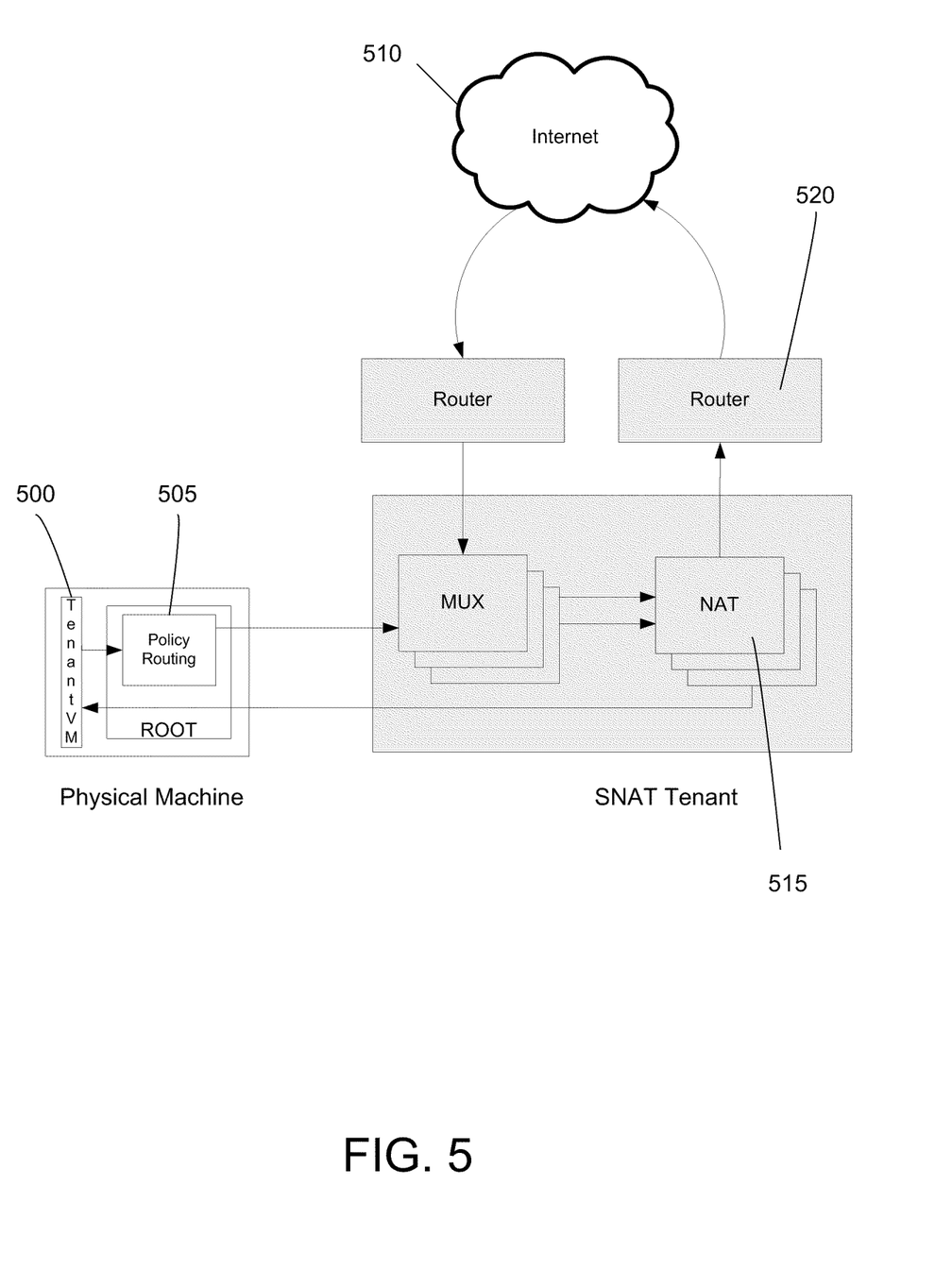
FIG. 5 is an illustration of packet flow through a sample network.

FIG. 4 illustrates another embodiment of a method of enabling an electronic privately addressable source to be publicly addressable and FIG. 5 is an illustration of packet flow through a sample network. At block 400, packets may be received from a tenant virtual machine 500 at a policy routing component 505. A tenant virtual machine 500 may be a machine on an internal network that may not have a public IP address. The policy routing component 505 may be responsible for ensuring that packets that are destined to the Internet 510 and contain dedicated IP address as the source address should be sent through the network address translation device 515. The network address translation device 515 may be identified by a special virtual IP address and the packets may be encapsulated with this virtual IP address as the destination.

At block 405, it may be determined if the packets are destined for an internetwork such as the Internet 510. This determination may be made in any logical, well known way, such as comparing the IP address of the outgoing packet to determine if the packet is meant to stay inside the network or flow outside the network to the internet 510. Of course, other methods are possible and are contemplated.

At block 410, it may be determined if the packets contain a private address as a source. This determination may be made in any logical, well known way, such as comparing the IP address of the outgoing packet to determine if the packet is meant to stay inside the network or flow outside the network to the internet 510. Of course, other methods are possible and are contemplated.

At block 415, it may be determined if at block 405, it was determined that the packets are destined for the internet 510 and at block 410, if it was determined that the packets contain the private address as the source, the packets may be communicated through a network address translation device 515 wherein the network address translation device 515 is identified by a first virtual IP address of the network address translation device 515.

At block 420, the packets may be encapsulated with the first virtual IP address as the destination address. As is well known, encapsulating the address includes the address inside a larger address. At block 425, the packets may be communicated to a first server or router 520 that handles packets addressed to the first virtual IP address.

At block 430, at the first server, packets may be received. At block 435, it may be determined if the packets are destined for the first virtual IP address of the network address translation device. The determination may be made by examining the address and port of the destination field. If the packets are destined for the first virtual IP address of the network address translation device, at block 440, the network address translation device may be selected. At block 445, the inner packet may be communicated to the network address translation device.

At block 450, the network translation device, the source address and the destination address and the source port and the destination port may be used to select a public address and a public port. In one embodiment, an unused public address and public port is selected from a set of available public addresses and public ports and recording in a memory that this combination of public address and public port correspond to the source private address and source private port. In one embodiment, using the source and destination address and source and destination port to select a public address and port may entail applying a hash function with bi-direction affinity to the destination address and destination port.

At block 455, the source address and source port may be translated to those selected at the network address translation device and at block 460, the packet may be communicated out on the internet.

If the packets are not destined for the first virtual IP address of the network address translation device, at block 465, the network translation device may be selected. At block 470, the packets may be communicated to the network address translation device. At block 475, at the network address translation device, the source address and destination address and source port and destination port may be used to select a private address and private port. At block 480, the destination address and destination port may be translated to those selected at the network address translation device and at block 485, the packets may be communicated to the private address sender.

Figure 6:
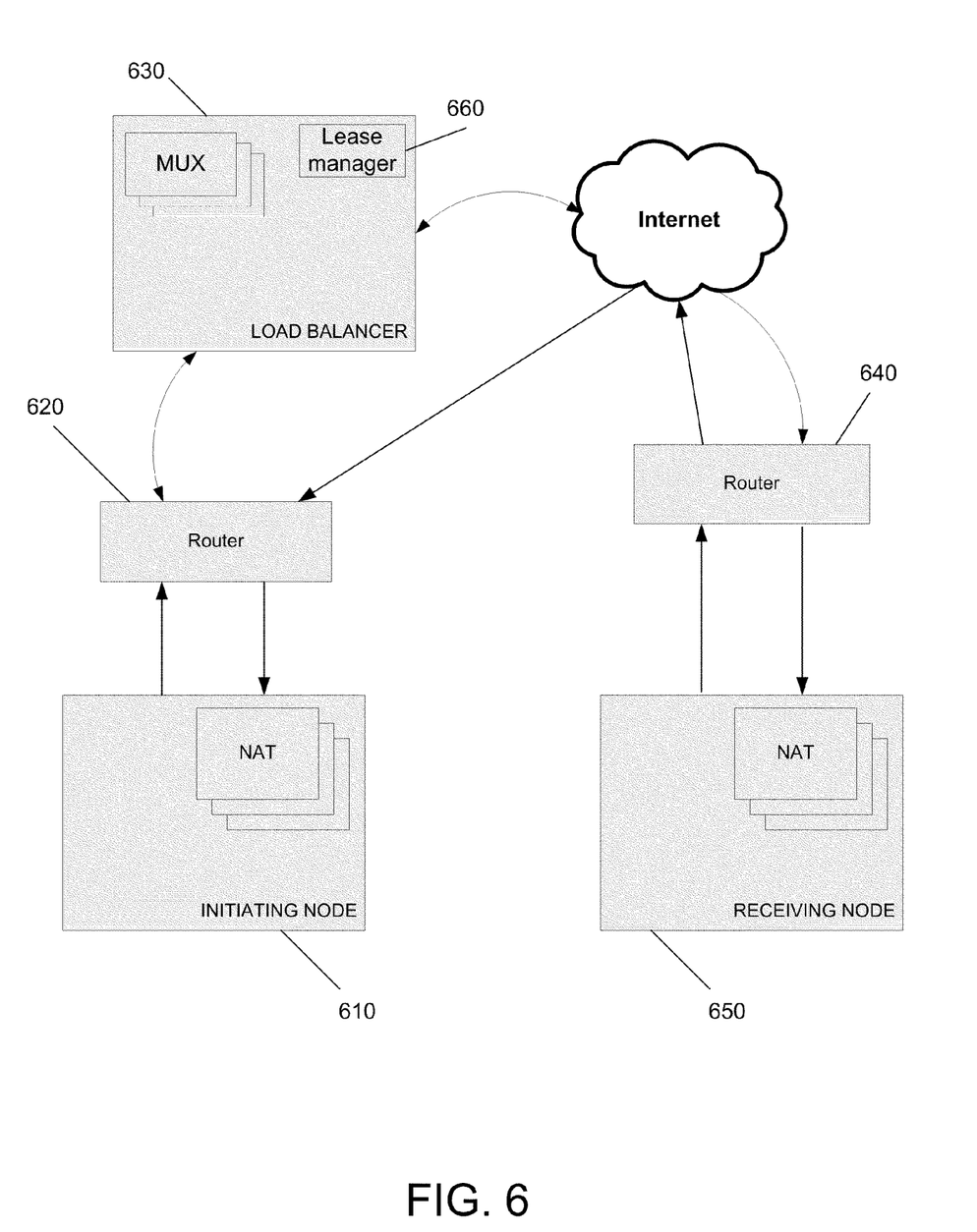
FIG. 6 is an illustration of another embodiment of packet flow through a sample network.

FIG. 6 illustrates another possible embodiment. In FIG. 6, an initiating node 610 communicates a first message through a router 620 to a load balancer 630, which may be a server, for example. The message is communicated through a network such as the Internet to a second router 640 and on to the receiving node 650. If the receiving node 650 desires to respond, the receiving node 650 communicates a responding message through the router 640 to the load balancer 630 to the first router 620 and back to the initiating node 610. The load balancer 630 or the lease manager 660 in the load balancer 630 may store the direct address for the initiating node 610. On subsequent communications, the receiving node 650 may obtain the direct address from a lease manager 660 in the load balancer 630. In other words, the responding receiving node 650 may retrieve a lease from the lease manager 660 to at least one of a public address or a port and translates the private address and the private port into a public address and a public port for the initiating node 610. As a result, future messages from the receiving node 650 to the initiating node 610 will not need to go through the load balancer 630 as the direct address (public address, public port) to the initiating node 610 will already be known.

In conclusion, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of enabling an electronic privately addressable source to be publicly addressable comprising:
    receiving packets from a tenant virtual machine at a policy routing component;
    determining if the packets are destined for Internet;
    determining if the packets contain a private address as a source;
    if the packets are destined for the Internet and contain the private address as the source, communicating the packets through a network address translation device wherein the network address translation device is identified by a first virtual IP address;
    encapsulating the packets with the first virtual IP address as the destination address;
    communicating the packets to a first server or load balancer that handles packets addressed to the first virtual IP address, at the first server or load balancer, receiving the packets;
    determining if the packets are destined for the first virtual IP address of the network address translation device;
    if the packets are destined for the first virtual IP address:
        selecting the network address translation device,
        communicating an inner packet to the network address translation device, at the network translation device,
        using the source address and the destination address and the source port and the destination port to select a public address and a public port,
        translating the source address and source port to those selected at the network address translation device, and
        communicating the packet out on the Internet;
    if the packets are destined for the public IP address chosen above:
        selecting the network translation device,
        communicating the packet to the network address translation device,
        at the network address translation device, using the source address and destination address and source port and destination port to select a private address and private port,
        translating the destination address and destination port to those selected at the network address translation device, and
        communicating the packet to the private address sender.

2. The method of claim 1, wherein using the source and destination address and source and destination port to select a public address and port comprises applying a hash function to the destination address and destination port.

3. The method of claim 1, wherein the using the source and destination address and source and destination port to select a public address and port comprises selecting an unused public address and public port from a set of available public addresses and public ports and recording state that this combination of public address and public port correspond to the source private address and source private port.

4. The method of claim 1, wherein the tenant virtual machine and the network address translation device are on separate computing machines.

* * * * *